(12) United States Patent
Inao et al.

(10) Patent No.: US 9,868,407 B2
(45) Date of Patent: *Jan. 16, 2018

(54) WIRE HARNESS (71) Applicant: Yazaki Corporation, Tokyo (JP)

(72) Inventors: Shinichi Inao, Makinohara (JP);
Hideomi Adachi, Makinohara (JP);
Takeshi Ogue, Makinohara (JP);
Tatsuya Oga, Makinohara (JP);
Masaaki Suguro, Makinohara (JP);
Yoshiaki Ozaki, Makinohara (JP);
Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,830

(22) Filed: Mar. 9, 2015

(65) Prior Publication Data
US 2015/0175098 A1 Jun. 25, 2015

Related U.S. Application Data (63) Continuation of application No. PCT/JP2013/074263, filed on Sep. 9, 2013.

(30) Foreign Application Priority Data

Sep. 10, 2012 (JP) ................. 2012-198580

(51) Int. Cl.
B60R 16/02 (2006.01)
H02G 3/04 (2006.01)

(52) U.S. Cl.
CPC ....... *B60R 16/0215* (2013.01); *H02G 3/0412* (2013.01); *H02G 3/0481* (2013.01); *H02G 3/0487* (2013.01)

(58) Field of Classification Search
CPC .......................... B60R 1/0215; H02G 3/0412
(Continued)

(56) References Cited

U.S. PATENT DOCUMENTS 5,370,733 A    12/1994  Gibbon
5,453,126 A *   9/1995  Gibbon .................... C08J 7/047
                                                    106/287.11
(Continued)

FOREIGN PATENT DOCUMENTS

CN       1171079 A      1/1998
CN     101805922 A *    7/1998
(Continued)

OTHER PUBLICATIONS

Office Action dated Feb. 16, 2016, by the Japanese Patent Office in counterpart Japanese Application No. 2012-198580.
(Continued)

*Primary Examiner* — Timothy Thompson
*Assistant Examiner* — Charles Pizzuto
(74) *Attorney, Agent, or Firm* — Sughrue Mion, PLLC (57) ABSTRACT A wire harness has at least one electrically conducting path and an exterior member accommodating the electrically conducting path to protect the electrically conducting path. The exterior member has a heat reflecting portion provided at at least a portion of an outer surface of the exterior member to reflect external heat.

10 Claims, 6 Drawing Sheets (58) Field of Classification Search
USPC ...................................................... 174/72 A
See application file for complete search history.

(56) References Cited

U.S. PATENT DOCUMENTS

| | | | |
|---|---|---|---|
| 5,718,956 A | 2/1998 | Gladfelter et al. | |
| 9,025,242 B2* | 5/2015 | Poirier | F21S 48/1394 |
| | | | 204/192.27 |
| 2002/0122945 A1* | 9/2002 | Sanduja | C08F 255/02 |
| | | | 428/423.1 |
| 2003/0024850 A1 | 2/2003 | Synder | |
| 2005/0011687 A1 | 1/2005 | Yamaguchi et al. | |
| 2006/0070598 A1* | 4/2006 | Marks | B60R 13/0869 |
| | | | 123/195 C |
| 2008/0286568 A1* | 11/2008 | Kopf | C09J 7/0296 |
| | | | 428/336 |
| 2009/0095525 A1 | 4/2009 | Watanabe | |
| 2010/0043225 A1* | 2/2010 | Oga | B60R 16/0207 |
| | | | 29/857 |
| 2010/0122831 A1 | 5/2010 | Watanabe | |
| 2013/0008711 A1 | 1/2013 | Toyama et al. | |
| 2013/0269971 A1 | 10/2013 | Yukawa et al. | |
| 2013/0284487 A1* | 10/2013 | Izawa | H01B 7/29 |
| | | | 174/107 |
| 2014/0166825 A1* | 6/2014 | Shiga | B60R 16/0215 |
| | | | 248/74.2 |
| 2015/0020911 A1* | 1/2015 | Shiga | B60R 16/0215 |
| | | | 138/108 |
| 2015/0170796 A1* | 6/2015 | Inao | B60R 16/0215 |
| | | | 174/72 A |

FOREIGN PATENT DOCUMENTS

| | | | | |
|---|---|---|---|---|
| CN | 1678449 | A | | 10/2005 |
| CN | 1309593 | C | | 4/2007 |
| CN | 101166651 | A | | 4/2008 |
| CN | 101805922 | A | * | 9/2010 |
| CN | 101864561 | A | | 10/2010 |
| CN | 201773611 | U | | 3/2011 |
| DE | 19800167 | A1 | * | 7/1998 ......... B60R 13/0869 |
| GB | 1262825 | A | * | 2/1972 ........... F24D 19/061 |
| JP | 4-61413 | U | | 5/1992 |
| JP | 6-128528 | A | | 5/1994 |
| JP | 6139838 | A | | 5/1994 |
| JP | 2000-28078 | A | | 1/2000 |
| JP | 2004-224156 | A | | 8/2004 |
| JP | 2011-193677 | A | | 9/2011 |
| JP | 2012138468 | A | | 7/2012 |
| RU | 2095679 | C1 | * | 4/1997 |
| RU | 95109041 | A | * | 4/1997 |
| WO | 2012118051 | A1 | | 9/2012 |

OTHER PUBLICATIONS

Communication dated Oct. 8, 2013 issued in International Application No. PCT/JP2013/074263 (PCT/ISA/210).
Communication dated Oct. 8, 2013 by the International Searching Authority in related application No. PCT/JP2013/074263.
Communication dated Jul. 4, 2016, issued by the State Intellectual Property Office of the People's Republic of China in counterpart Chinese Patent Application No. 201380046894.1.
Office Action dated Dec. 15, 2016 issued by the State Intellectual Property Office of P.R. China in counterpart Chinese Patent Application No. 201380046894.1.
Communication dated May 24, 2017, issued by the State Intellectual Property Office of the People's Republic of China in counterpart Chinese Patent Application No. 201380046894.1.
Office Action dated Sep. 6, 2017 by the State Intellectual Property Office of P.R. China in counterpart Chinese Patent Application No. 201380046894.1.
Communication dated Mar. 31, 2016, issued by the European Patent Office in counterpart European Patent Application No. 13835672.0.

* cited by examiner

WIRE HARNESS

CROSS REFERENCE TO RELATED APPLICATIONS

This application is a continuation of International Patent Application No. PCT/JP2013/074263 filed on Sep. 9, 2013, claiming priority from Japanese Patent Application No. 2012-198580 filed on Sep. 10, 2012, the contents of which are incorporated herein by reference.

FIELD OF INVENTION

The present invention relates to a wire harness including at least one electrically conducting path and an exterior member accommodating the electrically conducting path to protect the electrically conducting path.

BACKGROUND ART

Generally, electric connection is made between a battery and an inverter unit or between an inverter unit and a motor unit in a hybrid car or an electric car through a high voltage (that is, for high voltage use wire harness. The wire harness disclosed in Patent Document 1 identified below includes a high voltage electric wire which serves as a high voltage electrically conducting path and an exterior member accommodating the high voltage electric wire.

Patent Document 1: JP 2004-224156 A

The wire harness may be arranged so that part of the wire harness is disposed in the vicinity of a heat source such as an exhaust pipe, an exhaust manifold, an engine or a motor. In this case, the exterior member is directly exposed to heat radiated from the heat source according to the background-art technique. There is therefore a possibility that the heat may also affect the electrically conducting path accommodated in the exterior member.

SUMMARY OF INVENTION

The present invention has been made in view of the aforementioned circumstances. An object of the invention is to provide a wire harness which can reduce or prevent the influence of heat radiated from an external heat source.

In order to solve the aforementioned problem, a wire harness according to the present invention has the following features (1) to (8).

(1) A wire harness including at least one electrically conducting path and an exterior member accommodating the electrically conducting path to protect the electrically conducting path, the exterior member having a heat reflecting portion at at least a portion of an outer surface of the exterior member to reflect external heat.

(2) The wire harness according to (1 described above, wherein the exterior member is configured to have a tubular body.

(3) The wire harness according to (1) or (2) described above, wherein the exterior member has a portion to be attached to a vehicle underfloor.

(4) The wire harness according to any one of (1) to (3) described above, wherein the heat reflecting portion is formed as a coated portion or as a non-coated portion on the outer surface of the exterior member.

(5) The wire harness according to any one of (1) to (3) described above, wherein the heat reflecting portion is formed as a later-attached component or a later-attached member added on to the outer surface of the exterior member.

(6) The wire harness according to any one of (1) to (3) described above, wherein the heat reflecting portion is formed by vapor-deposition.

(7) The wire harness according to any one of (1) to (6) described above, wherein the heat reflecting portion is formed as a white or near-white light colored portion or as a lustered portion.

(8) A wire harness according to any one of (1) to (6) described above, wherein the heat reflecting portion is formed as a portion serving as a mirror.

According to the wire harness of (1) described above, the wire harness has the heat reflecting portion provided at at least a portion of the outer surface of the exterior member. Accordingly, the external heat can be reflected by the heat reflecting portion. Therefore, it is possible to reduce or prevent the influence of the heat on the electrically conducting path.

According to the wire harness of (2) described above, by applying to the wire harness having the exterior member formed as a tubular body, it is possible to reduce or prevent the influence of heat on the electrically conducting path of the wire harness.

According to the wire harness of (3) described above, by applying to the wire harness which is totally long enough to be arranged to pass below a vehicle underfloor, it is possible to reduce or prevent the influence of heat on the electrically conducting path of the wire harness.

According to the wire harness of (4) described above, the external heat can be reflected by the heat reflecting portion formed as the coated portion or as the non-coated portion.

According to the wire harness of (5) described above, the external heat can be reflected by the later-attached component or the later-attached member added on to the outer surface of the exterior member.

According to the wire harness of (6) described above, the external heat can be reflected by the heat reflecting portion formed by vapor-deposition.

According to the wire harness of (7) described above, the external heat can be reflected by the heat reflecting portion formed as the white or near-white light colored portion or as the lustered portion.

According to the wire harness of (8) described above, the external heat can be reflected by the heat reflecting portion formed as the portion serving as a mirror.

EMBODIMENTS OF INVENTION

A wire harness according to each of the following embodiments has heat reflecting portions provided at at least a portion of an outer surface of an exterior member. The exterior member accommodates and protects at least one electrically conducting path. Each of the heat reflecting portions has a function of reflecting heat radiated from an external heat source. Heat radiated from the heat source can be reflected by the heat reflecting portion so that the influence of the heat on the electrically conducting path can be reduced or prevented.

In the exterior member, the heat reflecting portions and the other portions are formed in different colors. The heat reflecting portions are formed in a color which reflects heat easily.

First Embodiment

Figure 1:
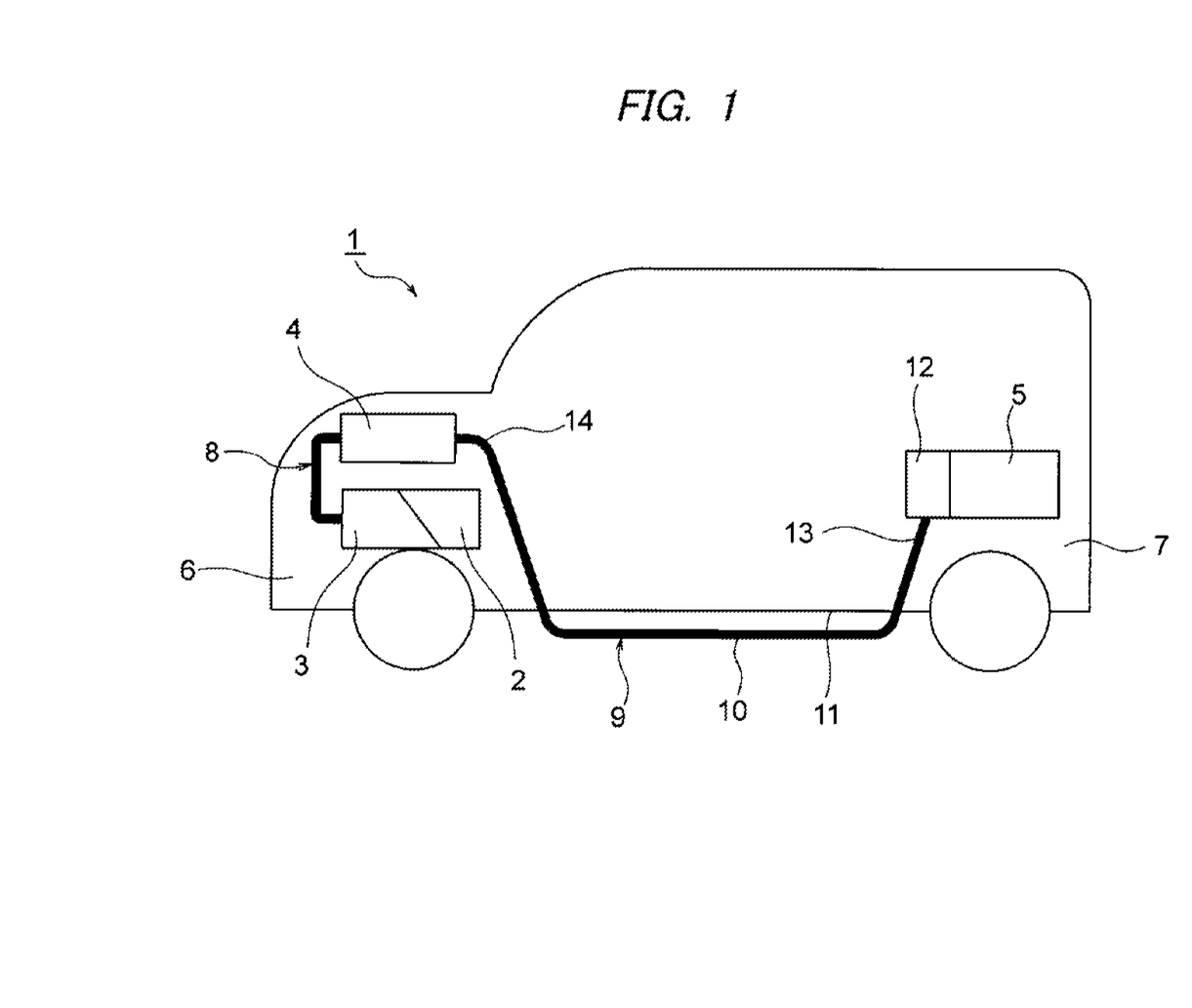
FIG. 1 is a diagram illustrating an arrangement of a wire harness.
Figure 2:
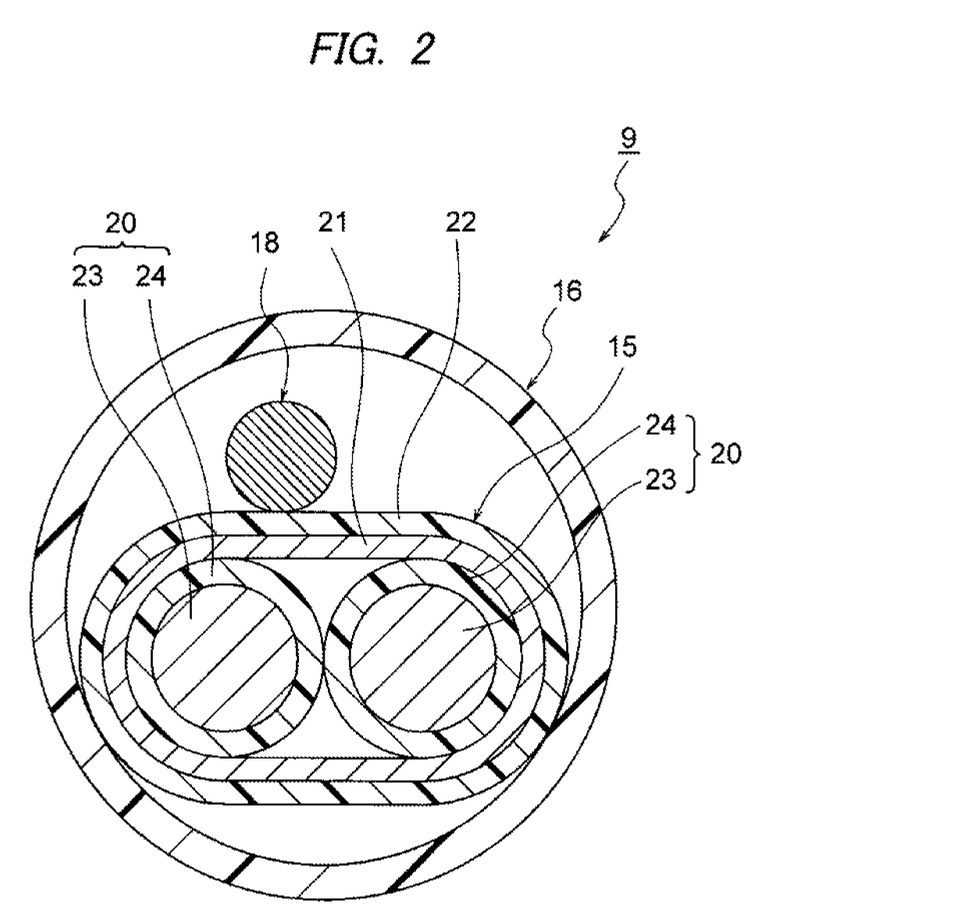
FIG. 2 is a view of a configuration of the wire harness.
Figure 3:
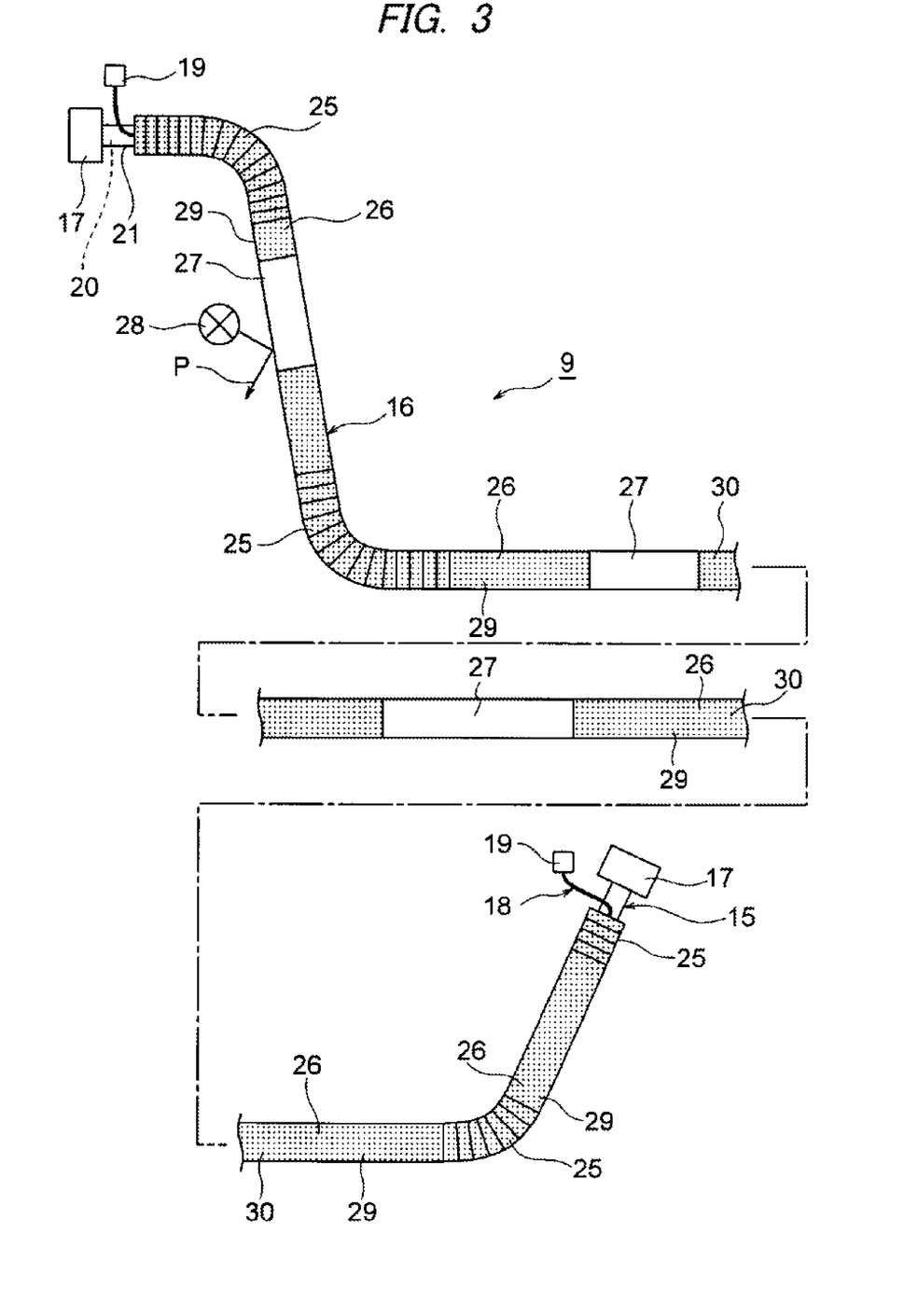
FIG. 3 is a view of a configuration of an exterior member.

A wire harness according to a first embodiment will be described below with reference to FIG. 1 to FIG. 4. FIG. 1 is a schematic view showing an arrangement state of the wire harness. In addition, FIG. 2 is a view of the configuration of the wire harness. FIG. 3 is a view of the configuration of an exterior member. FIG. 4(a) to FIG. 4(d) are views showing examples of a heat reflecting portion.

An example in which the wire harness according to the first embodiment is arranged in a hybrid car (which may be an electric car or a general car) will be described in the first embodiment.

In FIG. 1, the reference numeral 1 designates a hybrid car. The hybrid car 1 is a vehicle which is driven by a mixture of two motive powers of an engine 2 and a motor unit 3. Electric power is supplied from a battery 5 (in other words, battery pack) to the motor unit 3 through an inverter unit 4. The engine 2, the motor unit 3 and the inverter unit 4 are mounted in an engine room 6 located near to front wheels etc. in this example. In addition, the battery 5 is mounted in a vehicle rear portion 7 near to rear wheels etc. The battery 5 may be mounted in a car cabinet which is present at the rear of the engine room 6.

The motor unit 3 and the inverter unit 4 are electrically connected to each other through a high voltage wire harness 8. In addition, the battery 5 and the inverter unit 4 are also electrically connected to each other through a high voltage wire harness 9. The wire harness 9 has an intermediate portion 10 arranged in a vehicle underfloor 11. In addition, the wire harness 9 is arranged substantially in parallel with the vehicle underfloor 11. The vehicle underfloor 11 serves as a well-known body and a so-called panel member. Through holes (not shown) are formed at given locations on the vehicle underfloor 11. The wire harness 9 is inserted through the through holes.

The wire harness 9 and the battery 5 are electrically connected to each other through a junction block 12 provided in the battery 5. A rear end 13 of the wire harness 9 is electrically connected to the junction block 12 by a well-known method. A front end 14 side of the wire harness 9 is electrically connected to the inverter unit 4 by a well-known method.

The motor unit 3 has a motor (not shown) and a generator (not shown). In addition, the inverter unit 4 has an inverter (not shown) and a converter (not shown). The motor unit 3 is formed as a motor assembly including a shield casing (not shown). In addition, the inverter unit 4 is also formed as an inverter assembly including a shield casing (not shown). The battery 5 serves as an Ni—MH-based or Li-ion-based battery which is modularized. An electric storage device such as a capacitor may be used as the battery 5. The battery 5 is not limited particularly as long as it can be used in the hybrid car 1 or an electric car.

Next, the configuration and structure of the wire harness 9 will be described.

In FIG. 2, the wire harness 9 includes a high voltage electrically conducting path 15, an exterior member 16 accommodating the high voltage electrically conducting path 15 to protect the high voltage electrically conducting path 15, and shield connectors 17 (see FIG. 3) provided at terminals of the high voltage electrically conducting path 15. A low voltage electrically conducting path 18 is accommodated together with the high voltage electrically conducting path 15 in the exterior member 16. This configuration is merely an example, and the low voltage electrically conducting path 18 may be accommodated if needed. Connectors 19 (see FIG. 3) are provided at terminals of the low voltage electrically conducting path 18. The wire harness 9 is attached to the vehicle underfloor 11 (see FIG. 1) etc. through not-shown clamps.

The high voltage electrically conducting path 15 includes two high voltage circuits 20, a shield member 21 covering the two high voltage circuits 20, and a sheath 22 provided on an outer side of the shield member 21. This configuration is merely an example.

Each of the high voltage circuits 20 is a well-known high voltage electric wire. The high voltage circuit 20 includes a conductor 23, and an insulator 24 covering the conductor 23. The high voltage circuit 20 has a length required for electric connection. The high voltage circuit 20 is formed to be long because the wire harness 9 electrically connects the inverter unit 4 and the battery 5 for the junction block 12) to each other (see FIG. 1).

The conductor 23 is made of copper, a copper alloy, aluminum or an aluminum alloy. The conductor 23 may have a conductor structure which consists of twisted strands or a rod-like conductor structure which is rectangular or circular in section (for example, a conductor structure which serves as a rectangular single core or a circular single core. In this case, the electric wire itself also has a rod shape). The insulator 24 made of an insulating resin material is formed on an outer surface of the aforementioned conductor 23 by extrusion molding.

While a well-known high voltage electric wire is used as the high voltage circuit 20 in the first embodiment, it is not limited to this. That is, a high voltage circuit formed by providing an insulator on a well-known bus bar, or the like, may be used as the high voltage circuit 20.

The shield member 21 is an electromagnetic shield member (that is, a shield member as a countermeasure against electromagnetic wave) covering the two high voltage circuits 20 collectively. A well-brown braid which consists of a large number of strands braided into a cylindrical shape is used as the shield member 21. The shield member 21 is formed to have a length substantially the same as the whole length of the two high voltage circuits 20. An end portion of the shield member 21 is electrically connected to the shield casing (not shown) etc. of the inverter unit 4 (see FIG. 1) through the aforementioned high voltage side connection portion which is not shown.

For example, metal foil having conductivity or a member including the metal foil may be used as the shield member 21, as long as it can take a countermeasure against the electromagnetic wave.

The sheath 22 is formed by extrusion molding out of an insulating resin material into a given thickness on the outer side of the shield member 21. The sheath 22 is disposed in a position corresponding to an outermost layer of the high voltage electrically conducting path 15. The sheath 22 is subjected to terminal processing in manufacturing of the wire harness 9 so that a given length from each end of the shield member 21 can be exposed. The sheath 22 which has been subjected to the terminal processing is slightly longer than the exterior member 16.

Figure 6:
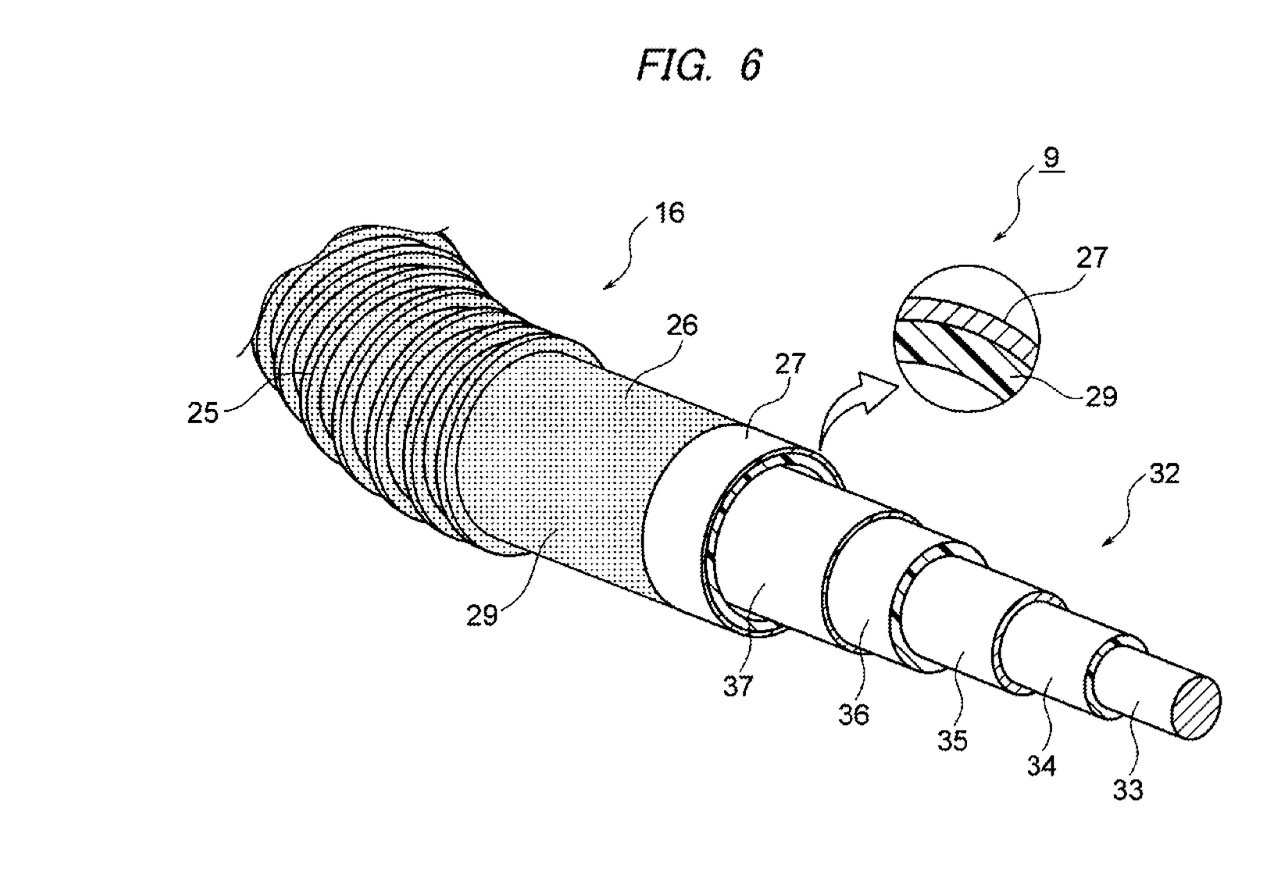
FIG. 6 is a view of a configuration of a wire harness according to a third embodiment.

A high voltage coaxial composite electrically conducting path 32 which will be described later with reference to FIG. 6 is listed as another example of the electrically conducting path than the high voltage electrically conducting path 15. In addition, a well-known shield electric wire etc. may be also listed as a further example of the electrically conducting path. The number of electrically conducting paths is not limited particularly, but it may be at least one electrically conducting path.

In FIG. 3, the exterior member 16 is a tube body-shaped member for accommodating and protecting the high voltage electrically conducting path 15. The exterior member 16 has flexible tube portions 25, inflexible tube portions 26 and heat reflecting portions 27. The exterior member 16 is molded out of a resin so that the flexible tube portions 25 and the inflexible tube portions 26 as a whole can be formed into an approximately linear shape. Although the flexible tube portions 25 and the inflexible tube portions 26 in the exterior member 16 are made of a resin in the first embodiment, they are not limited thereto but may be made of metal.

Each of the flexible tube portions 25 is provided as a portion which can be bent during transportation or path arrangement of the wire harness 9. The inflexible tube portions 26 are continuous to the flexible tube portions 25. Each of the inflexible tube portions 26 is provided as a portion which cannot be bent (or which can be hardly bent). The flexible tube portions 25 and the inflexible tube portions 26 are disposed and formed so that their positions and lengths can be adapted to an attachment shape to the vehicle. The flexible tube portions 25 and the inflexible tube portions 26 are formed so that their sectional shapes can agree with each other. That is, each flexible tube portion 25 and each inflexible tube portion 26 are formed in such a manner that when the sectional shape of the flexible tube portion 25 is circular, the sectional shape of the inflexible tube portion 26 is circular, or in such a manner that when the sectional shape of the flexible tube portion 25 is substantially rectangular, the sectional shape of the inflexible tube portion 26 is substantially rectangular.

Although there are a plurality of flexible tube portions 25 and a plurality of inflexible tube portions 26 in the first embodiment, the number of flexible tube portions 25 and the number of inflexible tube portions 26 are not limited particularly. That is, one flexible tube portion 25 may be provided while two inflexible tube portions 26 are formed continuously to the opposite sides of the flexible tube portion 25 respectively. Alternatively, one inflexible tube portion 26 may be provided while two flexible tube portions 25 are formed continuously to the opposite sides of the inflexible tube portion 26 respectively.

The heat reflecting portions 27 are disposed and formed at at least a portion of the outer surface (that is, a portion of the outer side or the entire outer side) of the exterior member 16. In the first embodiment, the heat reflecting portions 27 are disposed and formed in some inflexible tube portions 26. This configuration is merely an example. The inflexible tube portions 26 consist of some inflexible tube portions 26 in each of which the heat reflecting portion 27 is present and the other inflexible tube portions 26 in each of which the heat reflecting portion 27 is not present.

As will be described later, the heat reflecting portions 27 are provided as portions for reflecting external heat respectively in a plurality of places as indicated by an arrow P. The external heat is radiated, for example, from a heat source 28. Although one heat source 28 is illustrated in the first embodiment, the number of heat sources 28 is not limited thereto.

Examples of the heat source 28 in FIG. 3 include the engine 2 (see FIG. 1), an exhaust manifold, etc. for may include the engine 2, the motor unit 3, etc. or may further include an exhaust pipe).

The exterior member 16 will be described a little more in detail.

Each of the flexible tube portions 25 is formed into a bellows tube shape having concave portions and convex portions which both extend circumferentially and which are continuous to one another alternately. The length of the bendable portion 25 is set correspondingly to the bending range. The flexible tube portion 25 is formed with elasticity (or flexibility) and as a portion which can be bent. The flexible tube portion 25 is formed as a portion which is the same as a well-known corrugated tube in the first embodiment. The flexible tube portion 25 is not limited to the bellows tube shape as long as it has a bendable shape.

The exterior member 16 has a shape portion the same as the corrugated tube as described above. Accordingly, the exterior member 16 can be regarded as a "corrugated tube", a "partially formed corrugated tube" etc.

Each of the inflexible tube portions 26 has a inflexible tube body 29. The inflexible tube body 29 is formed as a portion which cannot be bent during the transportation or path arrangement as described above. The portion which cannot be bent means a portion which is not aggressively provided with flexibility. The inflexible tube body 29 is formed into a straight tube shape which is circular in section. The sectional shape of the inflexible tube body 29 is not limited to a circular shape but may be an elliptical shape, an oval shape, an approximately rectangular shape, or the like.

The inflexible tube body 29 is formed to be thin in thickness with requisite minimum strength. A portion which enhances rigidity, a portion which secures anti-chipping performance, etc. in addition to the heat reflecting portion 27 may be formed in the inflexible tube body 29.

The exterior member 16 is formed into a shape provided with no slit (or unslitted) in its tube axis direction. The reason why no slit is provided is to secure rigidity or strength. Another reason is to prevent intrusion of water to thereby improve waterproof performance. A further reason is to prevent the high voltage electrically conducting path 15 from sticking out, for example, in a bent portion.

The exterior member 16 has an underfloor inflexible tube portion 30 arranged as the inflexible tube portion 26 in the vehicle underfloor 11 (see FIG. 1). Since the underfloor inflexible tube portion 30 is arranged in the vehicle underfloor 11 (for example, arranged to extend along a lean hose), the underfloor inflexible tube portion 30 is formed to be long.

The exterior member 16 is molded out of a properly selected resin material which can easily absorb heat radiated from the high voltage electrically conducting path 15 accommodated in the exterior member 16 and which can easily release the heat to the outside. In addition, the color of the exterior member 16 is also suitably selected.

In FIG. 3 and FIG. 4(*a*) to FIG. 4(*d*), each of the heat reflecting portions 27 is formed as a functional portion which reflects external heat. The heat reflecting portion 27 is disposed and formed in a desired position and range in order to reflect the external heat. The heat reflecting portion 27 may also have a function of poorly absorbing heat or a function of shielding heat, in addition to the function of reflecting heat.

The heat reflecting portion 27 is formed, for example, as a white or near-white light colored portion or as a lustered portion. In addition, as another example, the heat reflecting portion 27 is formed as a portion serving as a mirror. Description will be made below a little more specifically.

Figure 4A:
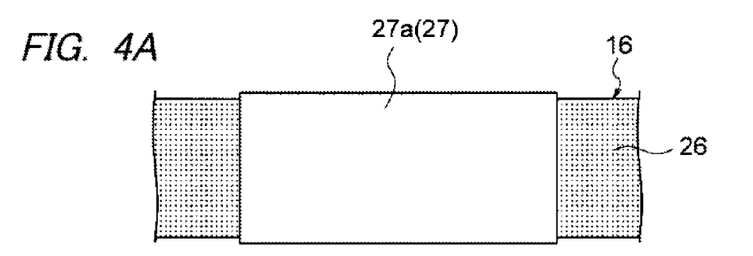
FIG. 4A to FIG. 4D are diagrams illustrating examples of a heat reflecting portion.
Figure 4B:
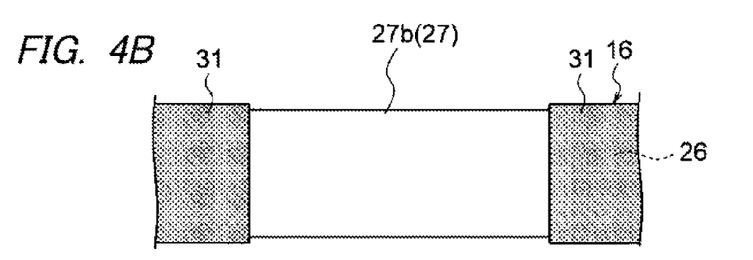

A heat reflecting portion 27a which is formed as a coated portion or which is formed by vapor-deposition is shown in FIG. 4A. In addition, a heat reflecting portion 27b which is formed as a non-coated portion is shown in FIG. 4B. The reference numeral 31 in FIG. 4B denotes a coated portion coordinated with the aforementioned non-coated portion. That is, in FIG. 4B, the heat reflecting portion 27b is formed as a portion to which no coating is applied. That is, the base itself of the exterior member 16 is formed as the heat reflecting portion 27b.

Figure 4C:
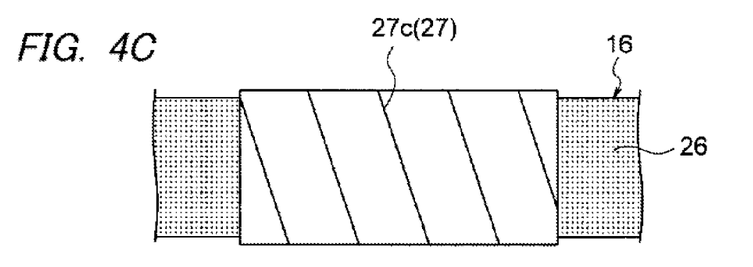

In addition, a heat reflecting portion 27c which is formed as a later-attached member is shown in FIG. 4C. The heat reflecting portion 27c is formed as a later-attached member to be added on to the outer surface of the exterior member 16. For example, the later-attached member is an aluminum foil tape etc. having a glitteringly shining surface (that is, lustered surface). The heat reflecting portion 27c is formed out of the later-attached member wound around the outer surface of the exterior member 16. The winding method is not limited to the winding method in FIG. 4C. Alternatively, the later-attached member pasted only on the side where the heat source is located may be set as the heat reflecting portion 27c.

Figure 4D:
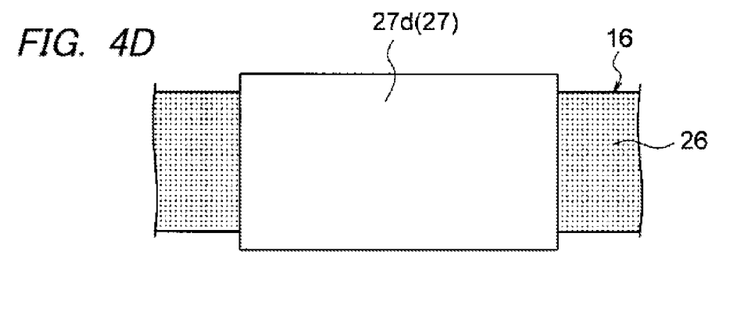

In addition, a heat reflecting portion 27d which is formed as a later-attached component is shown in FIG. 4D The heat reflecting portion 27d is formed as a later-attached component to be added on to the outer surface of the exterior member 16. For example, the later-attached component may be a mirror component etc. having a two-split structure. In this case, the later-attached component is divided into two split parts, and the exterior member 16 is interposed between the split parts. Thus, the later-attached component is integrated with the exterior member 16.

Other than the mirror component, it may be white or near-white light colored later-attached component having a glitteringly shining surface (that is, lustered surface).

For example, it has been known that the white color can fully reflect light (for example, sunlight includes light of a continuum of colors from red to violet). That is, since the white color surface hardly absorbs heat, the white color later-attached component is effective as the heat reflecting portion.

In addition, for example, a well-known protector, a well-known clamp or the like may be used as the later-attached component. The protector or the clamp is a component which originally does not have a function for reflecting external heat. However, as long as a part of the protector or the clamp is disposed in a portion desired to reflect heat, a portion serving as a heat reflecting portion may be formed in that part and used.

In addition, as to the heat reflecting portions 27, colors of the outer surface of the exterior member 16 may be separated into a bright color other than white and a general dark color and portions corresponding to the bright color may be used as the heat reflecting portions 27. It is a matter of course that the aforementioned effect can be obtained when the heat reflecting portions 27 are formed in such a state.

Next, a method for manufacturing the wire harness 9 will be described based on the aforementioned configuration and structure.

The high voltage electrically conducting path 15, the exterior member 16 and the low voltage electrically conducting path 18 are manufactured in advance to be straight and have respective predetermined lengths. Then, a step is performed to insert the high voltage electrically conducting path 15 and the low voltage electrically conducting path 18 into the exterior member 16 individually or together. A step is performed to provide the shield connectors 17 in the terminals of the high voltage electrically conducting path 15 and provide the connectors 19 in the terminals of the low voltage electrically conducting path 18. Thus, the manufacturing of the wire harness 9 is completed.

Circuit terminal portions of the two high voltage circuits 20 which are covered with shield terminal portions of the shield member 21 are led out from the terminals of the exterior member 16. In addition, separately from the high voltage electrically conducting path 15, the low voltage electrically conducting path 18 is also led out from the terminals of the exterior member 16.

As described above with reference to FIG. 1 to FIG. 4(d), the wire harness 9 has the heat reflecting portions 27 respectively in the plurality of places of the outer side of the exterior member 16. Accordingly, the external heat can be reflected by the heat reflecting portions 27. Thus, it is possible to obtain an effect that the influence of the heat on the high voltage electrically conducting path 15 can be reduced or prevented.

Second Embodiment

Figure 5:
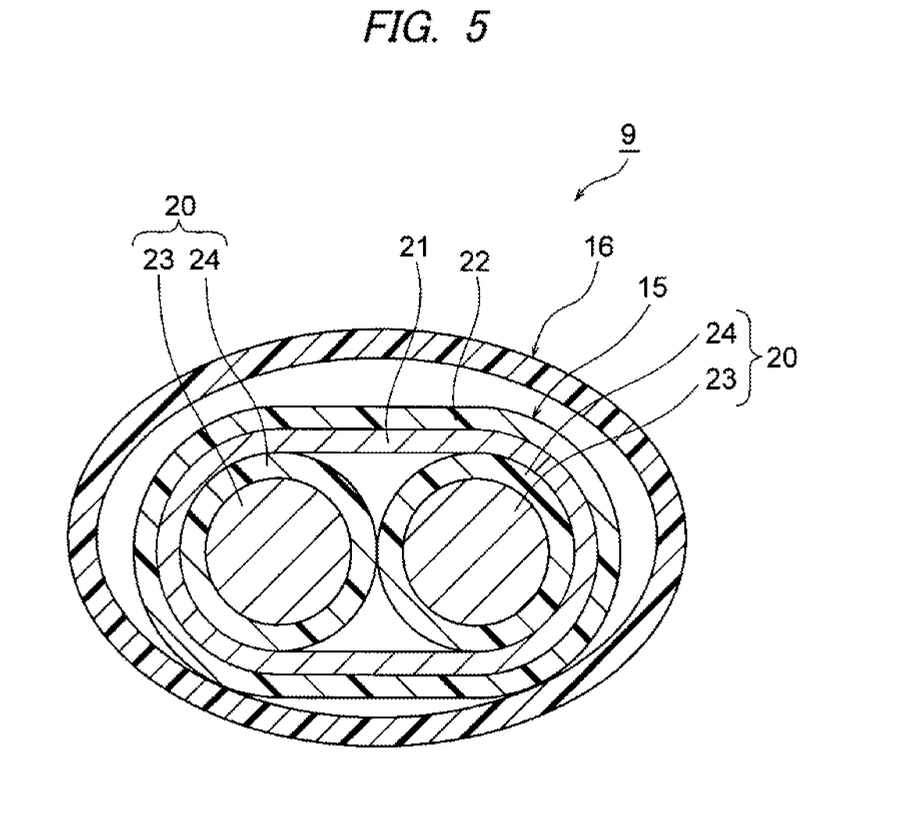
FIG. 5 is a view of a configuration of a wire harness according to a second embodiment.

A wire harness according to a second embodiment will be described below with reference to FIG. 5. FIG. 5 is a view of the configuration of the wire harness according to the second embodiment. Components that are basically the same as those in the aforementioned first embodiment are referred to by the same numerals respectively and correspondingly, and detailed description thereof will be omitted.

In FIG. 5, the wire harness 9 includes a high voltage electrically conducting path 15, an exterior member 16 accommodating the high voltage electrically conducting path 15 to protect the high voltage electrically conducting path 15, and shield connectors 17 provided at terminals of the high voltage electrically conducting path 15 (see FIG. 3). The exterior member 16 is formed not to have a circular shape in section as in the first embodiment, but to have an elliptical shape (which may be an oval shape) in section which can be adapted to the external shape of the high voltage electrically conducting path 15. Heat reflecting portions 27 (see FIG. 3) are provided respectively in a plurality of places of the exterior member 16.

Since the sectional shape of the exterior member 16 is elliptical, the height of the exterior member 16 can be made lower than that in the first embodiment. Accordingly, there is an advantage that the distance between the ground and the exterior member 16 can be gained when the exterior member 16 is attached to a vehicle underfloor 11 (see FIG. 1). In addition, since the sectional shape of the exterior member 16 is elliptical, an occupation rate of the high voltage electrically conducting path 15 in the internal space of the exterior member 16 can be increased. Thus, there is an advantage that heat of the high voltage electrically conducting path 15 can be transferred to the exterior member 16 easily. External heat can be reflected by the heat reflecting portions 27 so as not to affect the high voltage electrically conducting path 15.

Third Embodiment

A wire harness according to a third embodiment will be described below with reference to FIG. 6. FIG. 6 is a view of the configuration of the wire harness according to the third embodiment. Components that are basically the same as those in the aforementioned first and second embodiments are referred to by the same numerals respectively and correspondingly and detailed description thereof will be omitted.

In FIG. 6, the wire harness 9 includes a high voltage coaxial composite electrically conducting path 32 which serves as a high voltage electrically conducting path, an exterior member 16 accommodating the high voltage coaxial composite electrically conducting path 32 to protect the high voltage coaxial composite electrically conducting path 32, and not-shown shield connectors provided at terminals of the high voltage coaxial composite electrically conducting path 32. Heat reflecting portions 27 are provided respectively in a plurality of places of the exterior member 16.

The high voltage coaxial composite electrically conducting path 32 contains both a plus circuit and a minus circuit by itself. That is, the high voltage coaxial composite electrically conducting path 32 is configured to have circuits of two systems. Specifically, the high voltage coaxial composite electrically conducting path 32 has a first electrically conducting path 33 having a circular shape in section and located in the center of the high voltage coaxial composite electrically conducting path 32, a first insulator 34 covering an outer circumference of the first electrically conducting path 33 with a given thickness, a second electrically conducting path 35 provided on an outer side of the first insulator 34, a second insulator 36 covering an outer circumference of the second electrically conducting path 35 with a given thickness, and a cylindrical shield member 37 closely contacting an outer surface of the second insulator 36. The high voltage coaxial composite electrically conducting path 32 may further include a sheath to cover an outer circumference of the shield member 37 with a given thickness.

The shield member 37 is made of a well-known braid, metal foil, etc. Although the shield member 37 is arranged to be included in the configuration of the high voltage coaxial composite electrically conducting path 32 as described above, the shield member 37 may be arranged as follows. That is, the shield member 37 may be arranged to be slightly loosely fitted to the second insulator 36. The shield member 37 may be formed into a cylindrical shape and then brought into close contact with the outer surface of the second insulator 36. Alternatively, a tape-like or sheet-like shield member may be wound on the outer surface of the second insulator 36 and in close contact therewith as the shield member 37.

Examples of the electrically conducting path include a well-known shield electric wire etc. in addition to the high voltage coaxial composite electrically conducting path 32. The number of electrically conducting paths is at least one.

The high voltage coaxial composite electrically conducting path 32 has two systems in the third embodiment. However, the high voltage coaxial composite electrically conducting path 32 is not limited thereto, but may have three systems or more, n systems. The high voltage coaxial composite electrically conducting path 32 can have n systems if circuits are increased outward to keep the configuration as a single coaxial path.

It is a matter of course that the third embodiment can also obtain the same effect as that in the first embodiment. That is, the wire harness 9 has the heat reflecting portions 27 provided in the plurality of places of the outer side of the exterior member 16. Accordingly, external heat can be reflected by the heat reflecting portions 27 so that it is possible to obtain an effect that the influence of the heat on the high voltage coaxial composite electrically conducting path 32 can be reduced or prevented.

In addition, it is apparent that the present invention can be implemented with various changes within the scope of the invention.

A wire harness according to embodiments is summarized as follows.

(1) A wire harness 9 according to an embodiment is a wire harness including: at least one electrically conducting path (high voltage electrically conducting path 15 or high voltage coaxial composite electrically conducting path 32); and an exterior member 16 accommodating the electrically conducting path to protect the electrically conducting path. The exterior member 16 has the reflection portion 27 (27a to 27d) provided at at least a portion of an outer surface of the exterior member 16 to reflect external heat.

(2) In the wire harness 9 according to the embodiment, the exterior member 16 may be formed to have a tubular body.

(3) In the wire harness 9 according to the embodiment, the exterior member 16 may have a portion to be attached to a vehicle underfloor 11.

(4) In the wire harness 9 according to the embodiment, the heat reflecting portion 27 (27a, 27b) may be formed as a coated portion or as a non-coated portion on the outer surface of the exterior member 16.

(5) In the wire harness 9 according to the embodiment, the heat reflecting portion 27 (27c, 27d) may be formed as a later-attached component or as a later-attached member added on to the outer surface of the exterior member 16.

(6) In the wire harness 9 according to the embodiment, each of the heat reflecting portions 27 (27a) may be formed by vapor-deposition.

(7) In the wire harness 9 according to the embodiment, the heat reflecting portion 27 may be formed as a white or near-white light colored portion or as a lustered portion.

(8) In the wire harness 9 according to the embodiment, the heat reflecting portion 27 may be formed as a portion serving as a mirror.

What is claimed is:

1. A wire harness comprising:
   at least one electrically conducting path;
   an exterior member accommodating the electrically conducting path to protect the electrically conducting path; and
   a protector or a clamp attached to an outer surface of the exterior member such that both ends of the protector or the clamp with respect to a longitudinal direction of the exterior member are attached to the outer surface of the exterior member,
   wherein the protector or the clamp comprises a heat reflecting portion provided at at least a portion of an outer surface of the protector or the clamp to reflect external heat, and
   wherein the protector or the clamp is attached only to inflexible portions of the exterior member.

2. The wire harness according to claim 1, wherein the exterior member is configured to have a tubular body.

3. The wire harness according to claim 1, wherein the exterior member has a portion to be attached to a vehicle underfloor.

4. The wire harness according to claim 1, wherein the heat reflecting portion includes a coated portion on the outer surface of the heat reflecting portion.

5. The wire harness according to claim 1, wherein the heat reflecting portion includes a vapor-deposition layer.

6. The wire harness according to claim 1, wherein the heat reflecting portion includes a white or near-white light colored portion or a lustered portion.

7. The wire harness according to claim 1, wherein the heat reflecting portion includes a portion serving as a mirror.

8. The wire harness according to claim 1, wherein the heat reflecting portion includes a non-coated portion relative to the outer surface of the heat reflecting portion.

9. The wire harness according to claim 1, wherein the heat reflecting portion is provided at a position spaced apart from terminal ends of the exterior member.

10. The wire harness according to claim 1, wherein the heat reflecting portion of the protector or clamp is provided about substantially the entire outer periphery of the exterior member.

* * * * *